United States Patent Office 3,186,971
Patented June 1, 1965

3,186,971
POLYURETHANE POLYMERS FROM
LACTONE POLYESTERS
Fritz Hostettler, Charleston, W. Va., and Donald M.
Young, New York, N.Y., assignors to Union Carbide
Corporation, a corporation of New York
No Drawing. Filed June 22, 1964, Ser. No. 377,037
17 Claims. (Cl. 260—77.5)

This invention relates to novel isocyanato terminated lactone polyester polyurethane polymers which have a high degree of utility in the preparation of elastomers, foams, and fibers, and to novel methods for preparing the same.

This application is a continuation-in-part of application Serial No. 314,485, filed October 7, 1963, U.S. Patent 3,169,945, which in turn is a continuation-in-part of application Serial No. 577,950, filed April 13, 1956, now abandoned, both of the abovesaid applications being assigned to the same assignee as the instant application.

The novel isocyanato terminated lactone polyester polyurethane polymers can be prepared via the reaction of hydroxyl terminated lactone polyesters (described hereinafter) with an organic diisocyanate. As is readily appreciated by those skilled in the art, the reaction of a hydroxyl group (—OH) with an isocyanato group (—NCO) results in the formation of a urethane group, i.e.,

Moreover, since bifunctional reactants are involved, the abovesaid reaction will result in the formation of at least two urethane groups. Thus, the name "polyurethane" polymers. Furthermore, in order to obtain isocyanato terminated polymers via the linear extension of said hydroxyl terminated lactone polyesters with organic diisocyanates, it is manifest that one must employ a molar ratio of said diisocyanate to said lactone polyesters greater than one. Accordingly, the name "isocyanato-terminated" polymers. Lastly, the reaction involving two or more mols of said diisocyanate per mol of said hydroxyl terminated lactone polyesters merely results, on the average, in the "addition" of one molecule of said diisocyanate to each hydroxyl site contained in the lactone polyester molecule. Of course, this "addition" is the urethane formation reaction referred to previously. Such reaction of an isocyanato group with a hydroxyl group, as is documented in the literature, can be effected at room temperature or elevated temperatures. The reaction temperature is a matter of choice being primarily governed by the reaction rate desired and the thermal stability of the reactants and product. Of course, catalysts and/or retarders can influence this choice.

The reaction of the hydroxyl-terminated lactone polyesters with organic diisocyanates has the advantage of promoting substantially homogeneous isocyanato terminated lactone polyester polyurethane polymers, hereinafter referred to as "prepolymer(s)," in which the molecular weights of the individual molecules are reasonably close to the average molecular weight, that is, a narrow molecular weight distribution is obtained. Polyurethane products prepared from the novel prepolymers, e.g., elastomers, fibers, foams, etc., unexpectedly and surprisingly exhibit high uniformity re performance characteristics among which can be listed brittle temperature, tensile strength, non-hardening qualities, tear strength, cellular foam structure, tension set, elongation, etc., depending, of course, on the polyurethane product under consideration.

The novel prepolymers have outstanding utility in the preparation of elastomers and foams, particularly if at least a substantial proportion of lactone units in the hydroxyl terminated lactone polyester reactant is substituted, as explained hereinafter.

The hydroxyl terminated lactone polyesters which are contemplated as reactants are prepared by the polymerization reaction of an admixture containing a lactone and an organic initiator, in the presence or in the absence of an ester interchange catalyst, to form said lactone polyesters of widely varying and readily controllable molecular weights. The polymerization is initiated by reaction with one or more compounds having two reactive hydrogens capable, with or without the aid of a catalyst, of opening the lactone ring and adding it as an open chain without forming water of condensation. Compounds that are suitable for initiating the polymerization, and therefore referred to herein as initiators, include those organic compounds which contain two hydroxyl (—OH) groups, or two primary amino (—NH₂) groups, or two secondary amino (—NHR) groups, or mixtures of such groups.

The hydroxyl terminated lactone polyesters so obtained from the aforesaid polymerization reaction are characterized by the presence of recurring lactone units. These lactone polyesters include polyesters of individual unsubstituted and substituted lactones, copolyesters of different substituted lactones and copolyesters of substituted and unsubstituted lactones, as well as blends thereof.

The lactone used as a starting material may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

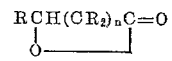

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring are considered unsuitable for the purposes of the invention because of the tendency that polymers thereof have to revert to the monomer, particularly at elevated temperature.

The lactones which are preferred in the preparation of the hydroxyl terminated lactone polyesters are the epsilon-caprolactones having the general formula:

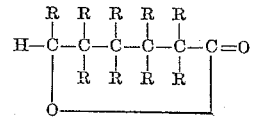

wherein at least six of the R variables are hydrogen and the remainder are hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve. Unsubstituted epsilon-caprolactone, in which all the R variables are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955, now U.S. Patent No. 3,064,008, issued November 13, 1962. The cyclohexanones may be obtained from substituted phenols or by other convenient synthetic routes.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be employed.

The various lactones may be utilized individually or in combination. When the lactone polyesters are intended to be used as intermediates for reaction with diisocyanates in the preparation of polyurethanes, it is generally preferred to utilize mixtures of substituted and unsubstituted lactones in order to achieve optimum non-hardening characteristics.

Bifunctional initiators which can be employed in the preparation of the hydroxyl-terminated lactone polyesters include those organic compounds which contain two alcoholic hydroxyl groups as illustrated by glycols of the formula $HO(CH_2)_nOH$ in which $n$ equals 2 to 10, glycols of the formulae $HO(CH_2CH_2O)_nH$ and $$HO[CH(CH_3)CH_2O]_nH$$

in which $n$ equals 1 to 40, such as ethylene glycol, diethylene glycol, and the like; 2,2-dimethyl-1,3-propanediol; 2,2-diethyl-1,3-propanediol; 3-methyl-1,3-pentanediol; methyl- and ethyldiethanolamines; the various cyclohexanediols; 4,4'-methylenebiscyclohexanol; 4,4'-isopropylidenebiscyclohexanol; the ortho-, meta-, and para-xylylene glycols; the hydroxymethyl substituted phenethyl alcohols; the ortho-, meta-, and para-hydroxymethyl phenylpropanols; the various phenylenediethanols; the various phenylenedipropanols; the various heterocyclic diols such as 1,4-piperazinediethanol; and the like. Polyester polyols prepared by the reaction of a dicarboxylic acid, its diester, or dihalide with a molar excess of a diol are likewise suitable, e.g., the reaction of one mol of adipic acid with 2 mols of ethylene glycol.

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamide, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorus acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxylalkylated derivatives suitable is illustrated by the reaction of 1,4-butanediol with ethylene oxide:

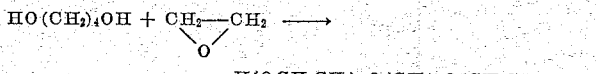

where $x+y=1$ to 40.

Suitable bifunctional initiators also include those compounds which contain a sole alcoholic hydroxyl group as well as a primary or secondary amino group as exemplified by amino alcohols of the general formula $$HO(CH_2)_nNH_2$$

where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like.

Among the bifunctional initiators which contain a total of two primary and/or secondary amino groups include the aliphatic diamines of the general formula $$H_2N(CH_2)_nNH_2$$

the monosecondary diamines of the general formula $$R''NH(CH_2)_nNH_2$$

and the disecondary diamines of the general formula $$R''NH(CH_2)_nNHR''$$

where $n$ equals 2 to 10 and where $R''$ is alkyl, aryl, aralkyl, or cycloalkyl; the aromatic diamines, like meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl-para-phenylenediamine, 2,5-fluorenediamine, and 2,7-fluorenediamine; the cycloaliphatic diamines like 1,4-cyclohexanediamine, 4,4'-methylenebiscyclohexylamine, and 4,4'-isopropylidenebiscyclohexylamine; and the heterocyclic amines such as piperazine, 2,5-dimethylpiperazine, and 1,4-bis(3-aminopropyl)-piperazine.

The initiator is believed to open the lactone ring to produce an ester or amide having one or more terminal groups that are capable of opening further lactone rings and thereby of adding more and more lactone units to the growing molecule. Thus, for example, the polymerization of epsilon-caprolactone initiated with an amino alcohol is believed to take place primarily as follows:

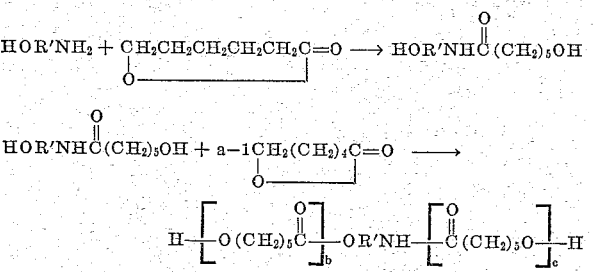

wherein R' (of the initiator and the resulting lactone polyester product) is an organic radical such as an aliphatic, cycloaliphatic, aromatic, or heterocyclic radical, and wherein $a=b+c$.

From the foregoing equation, it is apparent that the hydroxyl-terminated lactone polyesters can be conveniently represented by the general formula $$R'(YL_xZ)_2$$

in which the L variables stand for substantially linear units having the general formula:

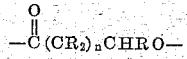

wherein $n$ is at least four, at least $n+2$ R's are hydrogen, the remaining R variables being substituents selected from the group consisting of hydrogen, alkyl, cycloalkyl, alkoxy, and single ring aromatic hydrocarbon radicals, and the total number of carbon atoms in the substituents on a given lactone unit does not exceed about twelve. The subscript $x$ averages at least two and preferably a number large enough to make the total molecular weight of the hydroxy-terminated lactone polyester about 1500 or higher. The number of linear groups in the final lactone polyester will depend in large part upon the molar ratio of lactone to initiator. R' is the divalent organic radical from the initiator (minus the hydroxyl and/or amino groups). The Y variables represent —O—, —NH—, and —NR"—, the R" variable being a hydrocarbon radical selected from the group consisting of alkyl, aryl, aralkyl, and cycloalkyl radicals. The Z radical represents hydrogen. It will be understood that a carbonyl moiety of a unit defined under the L variable is monovalently bonded to the Y variable. It is, also, to be understood that where a plurality of units as defined under L supra are linked together, such linkage is effected by monovalently bonding the oxy (—O—) moiety of one unit to the carbonyl

moiety of an adjacent unit. Of course, the oxy moiety of the terminal lactone unit is bonded to the Z radical (thus forming a hydroxyl end group).

To initiate and continue the polymerization of the lactone, the lactone and the initiator are preferably heated to a temperature between about 130 and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 130 and 200° C. is considered preferable.

The polymerization reaction can be carried out in the absence of a catalyst though it is preferred to effect the reaction in the presence of a basic or neutral ester interchange catalyst, to accelerate the reaction. Among catalysts suitable for this purpose are such metals as lithium, sodium, potassium, rubidium, caesium, magnesium, calcium, barium, strontium, zinc, aluminum titanium, cobalt, germanium, tin, lead, antimony, arsenic and cerium, as well as the alkoxides thereof. Additional suitable catalysts are by way of example, the carbonates of alkali- and alkaline earth metals, zinc, borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The catalysts that are particularly effective, and therefore preferred, in polymerizing the more difficulty polymerizable lactones such as epsilon-methyl-epsilon-caprolactone and the various dimethyl epsilon-caprolactones without undue discoloration of the resulting lactone polyesters are zinc borate, lead borate, zinc oxide, litharge (lead oxide), and especially organic titanium compounds.

The organic titanium compounds that are especially suitable as catalysts because of their ability to promote the formation of virtually colorless lactone polyesters in a short time are the titanates having the general formulae:

$$X_2TiO_3 \text{ and } X_4TiO_4$$

wherein the X variables represent alkyl, aryl or aralkyl radicals. The alkyl titanates in which the X variables are lower alkyl radicals, particularly methyl, ethyl, propyl, isopropyl, butyl, isobutyl, tertiary butyl, amyl, isoamyl, etc., radicals, are preferred. Titanates that deserve special mention because of their efficiency in accelerating the reaction and producing virtually colorless polyesters are tetraisopropyl titanate and tetrabutyl titanate.

The duration of the polymerization varies from about a few minutes to about a week depending upon the lactone or mixtures of lactones selected, the initiator, the reaction temperature and the catalyst, if one is present. If it is desired to obtain a lactone polyester product of superior color, then it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted lactone monomer may be removed by applying a vacuum thereto at elevated temperature, e.g., a vacuum of 1 to 5 mm. mercury at 120°–160° C.

The hydroxyl terminated lactone polyester products obtained in accordance with the preceding methods have average molecular weights generally upwards of about 1500 preferably within the range of from about 1500 to about 7000, although molecular weights below and substantially above this range are obtainable is desired. Thus, substantial departures can be made from this range of molecular weights, i.e., to as low as about 300 (corresponding to a hydroxyl number of 374) to as high as 5000 and even 7000 (corresponding to a hydroxyl number of 16). These hydroxyl terminated lactone polyesters are characterized by the presence of series of interconnected, substantially linear units or groups composed of carbon, hydrogen and oxygen. These interconnected units are opened lactone units which have a terminal oxy group at one end, a carbonyl group at the other end, and an intermediate chain of at least five carbon atoms and at least one hydrogen substituent on the carbon atom in the intermediate chain that is attached to the terminal oxy group. The oxy group of one lactone unit is connected to the carbonyl group of an adjacent lactone unit in the series and the oxy group of the last lactone unit in a series is connected to a hydrogen to form a terminal hydroxyl group at one end of the series.

When the polyesters are intended for use as intermediates in the preparation of polyurethane elastomers, foams, or coating materials, it is preferred to utilize a mixture of substituted and unsubstituted lactones and bifuctional initiator containing no carboxylic acid groups, i.e., a bifunctional initiator which contains hydroxyl and/or amino groups. The relative proportions of lactone to initiator should be such as to produce hydroxyl terminated lactone polyesters having a carboxyl number as low as possible and certainly no greater than ten and a hydroxyl number between about forty and about sixty so that the average molecular weight of said lactone polyester will be in the range of about 1900 to 2800. This range of molecular weights is preferred because it yields linearly extended polyester-polyurethane diisocyanate chains of optimum length and promotes the eventual formation of an elastomer having optimum properties of low brittle temperature, tensile strength, and non-hardening qualities. It is to be understood, as indicated above, that the average molecular weights of the lactone polyester diols can range from about 300 to 5000 and even 7000.

The preparation of the lactone polyetsers in accordance with the foregoing methods has a number of outstanding advantages. One that is unique and of utmost importance to the use of the lactone polyesters as intermediates in the preparation of polyurethanes is that with the particular catalysts employed, and without catalysts, the lactone polyesters are formed with reactive hydroxyl end groups that are not blocked to any significant extent by ester groups, chlorine, or the like. Another very important advantage is that no water of condensation is formed and that consequently the need for drying prior to reaction with a diisocyanate is obviated. In addition, the above methods have the advantage of permitting accurate control over the average molecular weight of the lactone polyester, and further of promoting the formation of a substantially homogeneous lactone polyester in which the molecular weights of the individual molecules are substantially all very close to the average molecular weight. This control is obtained by preselecting the molar proportions of lactone and initiator in a manner that will readily be appreciated by those skilled in the art. Thus, for example, if it is desired to form a lactone polyester in which the average molecular weight is approximately twenty times the molecular weight of the initial lactone or lactone mixture, then the proportions of lactone or lactone mixture to initiator utilized in the polymerization are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of the lactone polyester is to determine the average number of carboxyl and hydroxyl groups in a given amount of the lactone polyester. The acid number (milligrams of KOH per gram of polyester using phenolphthalein as an indicator) is a measure of the number of terminal carboxyl groups in a polyester. The hydroxyl number, which is a measure of the number of terminal hydroxyl groups and is defined in terms of milligrams of KOH per gram of lactone polyester, is determined by adding pyridine and acetic anhydride to the polyester and titrating the acetic acid formed with KOH as described in Ind. Eng. Chem., Anal. Ed., vol. 16, pages 541–9 and in Ind. Eng. Chem., Anal. Ed., vol. 17, page 394. The sum of the acid or carboxyl number and the hydroxyl number, referred to as the reactive number, is an indication of the average number of terminal hydroxyl groups present in the lactone polyester and therefore is in turn an indication of the number of molecules in the mass and the degree of polymerization. A lactone polyester containing long chain molecules will have a relatively low reactive number while a lactone polyester containing short chain molecules will possess a relatively high reactive number.

Those skilled in the art are quite aware of the organic diisocyanates which can be used to linearly extend the polymer chain of the lactone polyester diols. Illustrative of such organic diisocyanates are, for example, m- and p-phenylene diisocyanates, 2,4- and 2,6-tolylene diisocyanates, 4,4'-biphenylene diisocyanate, 3,3'-dimethyl-4,4'-biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis(ortho tolyl isocyanate), 1,5-naphthalene diisocyanate, etc. The publication of Siefken (Annalen, 562, pages 122–135 (1949)), lists numerous other diisocyanates which are useful for performing this reaction.

The advantages and utility of the method of the invention and of the products obtained thereby will become further apparent from the following detailed examples. The hydroxyl and carboxyl numbers referred to in the examples were obtained by the method described in Ind. Eng. Chem., Anal. Ed., vol. 17, page 394 (1945). The examination of the products was conducted at room temperature.

EXAMPLE 1

193 grams of epsilon-caprolactone and 7.5 grams of 3-aminopropanol were heated at 240–260° C. under a stream of nitrogen for twenty-four hours. The resulting polymer was a wax-like solid. The molecular weight determinations in boiling toluene gave values of about 1630.

EXAMPLE 2

179 grams of epsilon-caprolactone and 21.2 grams of p,p'-bibenzyldiamine were heated as in Example 1. The resulting polymer was a wax-like solid. The molecular weight determinations in boiling toluene gave values of about 2870.

EXAMPLE 3

221 grams of gamma-methyl-epsilon-caprolactone and 7.1 grams of ethylene glycol were heated with 0.005 gram of potassium carbonate at 150–180° C. under a stream of nitrogen for forty-eight hours. The resulting polymer was slightly yellow colored viscous liquid having a hydroxyl number of 54.1 and a carboxyl number of 0.1.

EXAMPLE 4

100 grams of a mixture (obtained from isophorone) of beta-beta,delta-trimethyl-epsilon-caprolactone and beta,delta,delta-trimethyl-epsilon-caprolactone and 3.2 grams of ethylene glycol were heated with 0.1 gram of sodium at 180° C. under a stream of nitrogen for thirty-six hours. The product was then subjected to stripping at a temperature of 108–160° C. under a vacuum of 3 mm. mercury. The polymer was a viscous liquid having a hydroxyl number of 69.

EXAMPLE 5

100 grams of the lactone mixture of Example 4, 57 grams of epsilon-caprolactone and 3.9 grams of ethylene glycol were heated with 0.07 gram of tetrabutyl titanate at 170° C. under nitrogen for five hours. The resulting product was a reddish-brown liquid having a hydroxyl number of 47.2, a carboxyl number of 0.95 and a molecular weight of 2280.

EXAMPLE 6

100 grams of the lactone mixture of Example 4 and 3.2 grams of ethylene glycol were heated with 0.1 gram of antimony trioxide to 175–180° C. under nitrogen for seventy-two hours. The product was stripped at 120–160° C. under a vacuum of 3 mm. mercury. The polymer was a brown viscous liquid having a hydroxyl number of 60.4.

EXAMPLE 7

140 grams of a mixture of beta-methyl-, gamma-methyl-, and delta-methyl-epsilon-caprolactones and 3.7 grams of ethylene glycol were heated with 0.01 gram of calcium to 170–180° C. under nitrogen for eighty-six hours. The resulting polymer was a yellow viscous liquid having a hydroxyl number of 49.8 and a carboxyl number of 1.0.

EXAMPLE 8

200 grams of epsilon-caprolactone and 6.2 grams of ethylene glycol were heated at 170° C. under nitrogen for forty hours. The resulting polymer was a solid, wax-like material having a hydroxyl number of 54.4 and a carboxyl number of 1.0.

In the following examples, initiators, lactones, and catalysts, of varying amounts and identities, were mixed and heated to a controlled temperature of 170° C. while a slow stream of nitrogen was passed through the mixture to exclude air and moisture, thus preventing discoloration of the polyester from oxygen. The polymerization was followed by refractive index measurements at 30° C., the reaction being regarded as complete as soon as the index became constant. The particular catalysts, the amounts used, the polymerization time and the hydroxyl and carboxyl number and color of the polyester products are noted.

EXAMPLE 9

Lactone: 85 g. alpha- and epsilon-methyl-epsilon-caprolactones, and 245 g. beta-, gamma- and delta-methyl-epsilon-caprolactones
Initiator: 9.15 g. ethylene glycol
Catalyst: 0.20 g. calcium methoxide
Reaction time: 20 hours
Hydroxyl number: 47.2
Carboxyl number: 1.9
Viscosity: Low
Color: Yellow

EXAMPLE 10

Lactone: 120 g. epsilon-caprolactone and 120 g. beta-, gamma- and delta-methyl-epsilon-caprolactone
Initiator: 90 g. polyethylene glycol (average molecular weight: 600)
Catalyst: 0.20 g. zinc borate
Reaction time: 3.0 hours
Hydroxyl number: 47.5
Carboxyl number: 1.4
Viscosity: Low
Color: Yellow

EXAMPLE 11

Lactone: 100 g. epsilon-caprolactone and 250 g. beta-, gamma- and delta-methyl-epsilon-caprolactones
Initiator: 85 g. polypropylene glycol (average molecular weight: 425)
Catalyst: 0.10 g. tetraisopropyl titanate
Reaction time: 1.0 hour
Hydroxyl number: 51.4
Carboxyl number: 0.6
Viscosity: Low
Color: Light yellow

EXAMPLE 12

Lactone: 80 g. alpha- and epsilon-methyl-epsilon-caprolactones and 160 g. beta-, gamma- and delta-methyl-epsilon-caprolactones
Initiator: 205 g. polypropylene glycol (average molecular weight: 1025)
Catalyst: 0.10 g. tetrabutyl titanate
Reaction time: 6.0 hours
Hydroxyl number: 51.6
Carboxyl number: 0.6
Color: Yellow

EXAMPLE 13

Lactone: 30 g. epsilon-caprolactone and 70 g. beta-, gamma- and delta-methyl-epsilon-caprolactones
Initiator: 4.6 g. p-xylene-alpha-alpha'-diol
Catalyst: 0.05 g. litharge
Reaction time: 2.0 hours
Hydroxyl number: 33.5
Carboxyl number: 1.1
Color: Light brown

EXAMPLE 14

Lactone: 539 g. epsilon-caprolactone and 602 g. beta- and delta-methyl-epsilon-caprolactones
Initiator: 31 g. ethylene glycol
Catalyst: 0.55 g. calcium methoxide
Reaction time: 24 hours
Hydroxyl number: 48.4
Carboxyl number: 0.3
Molecular weight: 2280
Color: Yellow

EXAMPLE 15

Lactone: 100 g. beta- and delta-methyl-epsilon-caprolactones
Initiator: 3.40 g. N-methylethanolamine
Catalyst: 0.05 g. tetraisopropyl titanate
Reacton time: 1.25 hours
Hydroxyl number: 46.7
Carboxyl number: 0.7
Viscosity: Low
Color: Light brown

EXAMPLE 16

Lactone: 100 g. beta- and delta-methyl-epsilon-caprolactones
Initiator: 7.9 g. 4,4'-methylenedianiline
Catalyst: 0.05 g. litharge
Reaction time: 16 hours
Hydroxyl number: 40.1
Carboxyl number: 1.0
Viscosity: High
Color: Light brown

EXAMPLE 17

Lactone: 50 g. epsilon-caprolactone and 50 g. beta- and delta-methyl-epsilon-caprolactones
Initiator: 6.1 g. benzidine
Catalyst: 0.05 g. zinc borate
Reaction time: 4 hours
Hydroxyl number: 30.6
Carboxyl number: 1.3
Viscosity:
Color: Brown, waxy solid

EXAMPLE 18

Lactone: 100 g. alpha- and epsilon-methyl-epsilon-caprolactones and 250 g. beta- gamma- and delta-methyl-epsilon-caprolactones
Initiator: 12.0 g. diethylenetriamine
Catalyst: 0.10 g. tetrabutyl titanate
Reaction time: 4 hours
Hydroxyl number: 50.4
Carboxyl number: 2.6
Viscosity: Medium
Color: Yellow

EXAMPLE 19

Lactone: 100 g. beta- and delta-methyl-epsilon-caprolactones
Initiator: 2.0 g. tetraethylenepentamine
Catalyst: 0.05 g. zinc borate
Reaction time: 18 hours
Hydroxyl number: 23.3
Carboxyl number: 2.6
Viscosity: High
Color: Brown

EXAMPLE 20

Lactone: 400 g. mixture of dimethyl-, ethyl-, trimethyl-, methylethyl- and propyl-caprolactones (prepared from a xylenol fraction boiling at 224–229° C.)
Initiator: 8.45 g. ethylene glycol
Catalyst: 0.2 g. tetrabutyl titanate
Reaction time: 22.5 hours
Hydroxyl number: 36.4
Carboxyl number: 1.9
Viscosity: Medium
Color: Reddish brown

EXAMPLE 21

Lactone: 400 g. gamma-methyl-epsilon-caprolactone
Initiator: 8.3 g. ethylene glycol
Catalyst: None
Reaction time: 72 hours
Hydroxyl number: 37.3
Carboxyl number: 0.3
Molecular weight: 2950
Color: Yellow The molecular weight range of the products prepared in accordance with Examples 9 through 21 was from about 2000 to 10,000. The molecular weight of each product is readily calculable from the hydroxyl and carboxyl numbers and the functionality of the polyester by the following formula:

$$\text{M.W.} = \frac{\text{Functionality} \times 1000 \times 56.1}{\text{Hydroxyl number} + (2 \times \text{carboxyl number})}$$

Molecular weight so calculated is fairly accurate, particularly so long as the carboxyl content is fairly low, i.e., not appreciably greater than about five.

In most of the examples in which a brown color is reported, technical or practical grade initiators were employed, indicating that the brown color is due not to decomposition of the lactones during the polymerization, but from impurities contained in the initiator. Exceptions to this were observed in the use of strongly basic ester interchange catalysts where some decomposition of the lactones probably occurs upon prolonged heating.

Several representative substituted epsilon-caprolactones were polymerized by heating to various temperatures with an amount of ethylene glycol calculated to yield an average molecular weight of 2200 without a catalyst and with representative concentrations of the catalysts indicated in the table below. The catalyst concentrations are in terms of percent by weight of lactone and the procedure in each polymerization was to add the catalysts after the reactants had reached the indicated temperature. The progress of the polymerization was followed, and polymerization time was determined, by means of the refractive index, which becomes constant when polymerization is complete. The data are set forth in Table I below.

*Table I*

| Epsilon-Caprolactone | Catalyst | Catalyst Concentration, Percent | Temperature, °C. | Time, hrs. |
|---|---|---|---|---|
| Mixed alpha- and epsilon-methyl. | None | | 170 | 102 |
| Do | Tetrabutyl titanate. | 0.1 | 170 | 1.75 |
| Do | do | 0.05 | 170 | 1.75 |
| Do | do | 0.01 | 170 | 2 |
| Do | do | 0.1 | 150 | 2.75 |
| Do | do | 0.05 | 150 | 5.25 |
| Do | do | 0.01 | 150 | 7.75 |
| Do | do | 0.1 | 130 | 7.75 |
| Do | do | 0.05 | 130 | 19 |
| Do | do | 0.01 | 130 | 16 |
| Beta, delta-dimethyl | None | | 170 | 102 |
| Do | Tetraisopropyl titanate. | 0.05 | 170 | 0.5 |
| Gamma-methyl | None | | 170 | 70 |
| Do | Tetraisopropyl titanate. | 0.05 | 170 | 0.25 |
| Mixed beta- and delta-methyl. | None | | 170 | 29 |
| Do | Tetraisopropyl titanate. | 0.05 | 170 | 0.5 |
| Mixed alpha- and epsilon-methyl. | Zinc borate | 0.1 | 170 | 7.75 |
| Do | do | 0.05 | 170 | 10 |
| Do | do | 0.01 | 170 | 19 |
| Do | do | 0.05 | 150 | 23.5 |
| Do | do | 0.05 | 130 | 47 |
| Beta, delta-dimethyl | do | 0.05 | 170 | 3.75 |
| Gamma-methyl | do | 0.05 | 170 | 2 |
| Mixed beta- and delta-methyl. | do | 0.05 | 170 | 3.75 |
| Mixed alpha- and epsilon-methyl. | Litharge | 0.1 | 170 | 7.25 |
| Do | do | 0.05 | 170 | 10 |
| Do | do | 0.01 | 170 | 19 |
| Do | do | 0.05 | 150 | 40 |
| Do | do | 0.05 | 130 | 59 |
| Do | Lead borate | 0.1 | 170 | 10.5 |
| Beta, delta-dimethyl | Litharge | 0.05 | 130 | 1.25 |
| Gamma-methyl | do | 0.05 | 170 | 1.75 |
| Mixed beta- and delta-methyl. | do | 0.05 | 170 | 1.25 |
| Alpha- and epsilon-methyl. | Aluminum isopropoxide. | 0.1 | 170 | 46 |

The data in Table I illustrates the remarkable efficacy of the preferred catalysts in accelerating the polymerization of the more difficult polymerizable lactones.

EXAMPLE 22

221 grams of gamma-methyl-epsilon-caprolactone were heated with 7.1 grams ethylene glycol under nitrogen and in the presence of 0.005 gram potassium carbonate for forty-eight hours at 150°–180° C. After this time, no monomer could be recovered. The resulting lactone polyester was a slightly yellow, viscous liquid having a hydroxyl number of 54.1, a carboxyl number of 0.1 and a molecular weight of 2075.

100 grams of this polyester was heated to 130°–150° C. with 18.1 grams of p,p'-diphenylmethane diisocyanate, and the resulting admixture was maintained thereat for a period of 30 minutes. There was obtained a viscous liquid isocyanato-terminated polyurethane lactone polyester product.

EXAMPLE 23

120 grams of unsubstituted epsilon-caprolactone and 80 grams of a mixture of beta-, gamma-, and delta-methyl-epsilon-caprolactones were copolymerized with 6.4 grams of ethylene glycol in the presence of 0.02 gram calcium by heating to 180° C. under nitrogen for eighty-six hours. After this time, no monomers could be recovered under vacuum. The resulting lactone polyester was a slightly yellow colored, viscous liquid having a hydroxyl number of 58.1 and a carboxyl number of 1.0.

115 grams of this polyester were reacted with 22.3 grams of p,p'-diphenylmethane diisocyanate at 130–150° C., and the resulting admixture was maintained thereat for a period of 30 minutes. There was obtained a viscous liquid isocyanato-terminated polyurethane lactone polyester product.

EXAMPLE 24

A lactone copolyester was prepared by heating 500 grams of a mixture of alpha-, beta-, gamma-, delta-, and epsilon-methyl-epsilon-caprolactones (obtained from a mixture of ortho-, meta-, and para-cresols) with 14.5 grams ethylene glycol in the presence of 0.25 gram dibutyltin oxide at 170° C. under nitrogen for four hours. The resulting lactone copolyester was a slightly yellow, viscous liquid having a hydroxyl number of 43.7, a carboxyl number of 2.3 and a molecular weight of about 2320.

300 grams of this copolyester were reacted at 130°–140° C. with 54 grams of 3,3'-dimethyl-4,4'-biphenylene diisocyanate, and the resulting admixture was maintained thereat for a period of 30 minutes. There was obtained a viscous liquid isocyanato-terminated polyurethane lactone copolyester product.

EXAMPLE 25

A lactone copolyester was prepared by heating 216 grams epsilon-caprolactone and 139 grams of a mixture of dimethyl-epsilon-caprolactones (obtained from a xylenol fraction boiling at 212.5–219° C.) with 11.6 grams ethylene glycol in the presence of 0.2 gram dibutyltin oxide at 170° C. under nitrogen for nineteen hours. The resulting lactone copolyester was a yellow, viscous liquid having a hydroxyl number of 48.3, a carboxyl number of 1.9 and a molecular weight of about 2190.

300 grams of this copolyester were reacted with 55.3 grams 3,3'-dimethyl-4,4'-biphenylene diisocyanate at 130–140° C., and the resulting admixture was maintained thereat for a period of 30 minutes. There was obtained a viscous liquid isocyanato-terminated polyurethane lactone polyester product.

EXAMPLE 26

100 grams of epsilon-caprolactone and 4.3 grams of tetramethylene glycol were heated under nitrogen for forty-eight hours at 180° C. in the presence of 0.01 gram potassium carbonate as catalyst. Thereafter a vacuum of a few millimeters mercury was applied, but no monomer could be recovered. The resulting solid polyester had a hydroxyl number of 62.3 and an estimated molecular weight of approximately 1800. This polyester (97 grams) was reacted at 120–140° C. for ten minutes with 20.3 grams of p,p'-diphenylmethane diisocyanate. After a period of one hour, there is obtained a solid isocyanato-terminated polyurethane polyester product.

EXAMPLE 27

200 grams of epsilon-caprolactone were heated with 6.2 grams ethylene glycol under nitrogen for forty hours at 170° C. After this time, no monomer could be recovered. The resulting polyester was a solid, wax-like material having a hydroxyl number of 54.4, a carboxyl number of 1.0 and a molecular weight of approximately 2000. This polyester (181 grams) was heated to 120–

145° C. with 33 grams of p,p'-diphenylmethane diisocyanate. After a period of one hour, there is obtained a solid isocyanato-terminated polyurethane polyester product.

EXAMPLE 28

One mol of diethylene glycol was heated with eight mols of epsilon-caprolactone in the presence of 0.3 gram of tetrabutyltitanate under nitrogen at 170° C. for six hours. The resulting polyester was a solid, wax-like material having a hydroxyl number of 112 and a molecular weight of about 1000. This polyester (500 grams) was heated with 174 grams of an 80:20 mixture of 2,4- and 2,6-tolylene diisocyanates at 90° C., for a period of 30 minutes. Upon cooling to room temperature, the resulting isocyanato-terminated product solidifies.

Also within the scope of the hydroxyl terminated lactone polyesters are those in which the linear lactone units need not necessarily be connected directly to one is readily accomplished, for example, by reacting mixtures of lactones with combinations of initiators such as dibasic acids and glycols, diamines, and amino alcohols. This type of reaction and the type of polyester produced thereby may be illustrated by the reaction of one mol of adipic acid, one mol of gamma-methyl-epsilon-caprolactone and slightly more than one mol of ethylene glycol which results in a hydroxyl terminated polyester having the general formula:

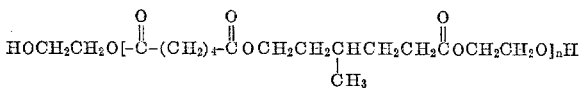

in which the acid, lactone, and glycol units are in random distribution and not necessarily as specifically illustrated. The variations in structure and in distribution that are obtainable by this means can readily be appreciated in view of the fact that the lactone is capable of reacting with both the acid and the glycol.

Polyesters produced in accordance with the foregoing embodiment of the invention are also suitable in the preparation of polyurethane resins and coating compositions. It is preferable to utilize a slight excess of glycols, diamines, or amino alcohols over the molar amount of dicarboxylic acid employed in order to achieve a polyester having predominantly terminal hydroxyl or amino groups and to remove the water of condensation formed by the reaction of the dibasic acid with the hydroxyl or amino groups of the glycols, diamines, or amino alcohols.

EXAMPLE 29

730 grams of adipic acid, 570 grams of epsilon-caprolactone and 357 grams of ethylene glycol were heated to 160° C. under nitrogen until the water of condensation ceased to distill over. The reactants were then maintained at an increased temperature of 180°–190° C. for an additional seventy-two hours. The mixture was thereupon subjected to a vacuum of 3 mm. of Hg for six hours at 120° C. A pale brown, viscous polymer having a hydroxyl number of 40 and a carboxyl number of 1.4 was obtained.

EXAMPLE 30

636 grams of a mixture of 13 parts glutaric acid to 37 parts glutaric anhydride, 570 grams of epsilon-caprolactone and 357 grams of ethylene glycol were heated under nitrogen to 160° C. until the water of condensation ceased to distill over. The reactants were then kept at 180° C. for an additional sixty hours and then subjected to a vacuum of 3 mm. of Hg for three hours at the same temperature. The resulting polymer was a yellow, viscous liquid having a hydroxyl number of 46 and a carboxyl number of 2.7.

EXAMPLE 31

584 grams of adipic acid, 512 grams of a mixture of beta-, gamma-, and delta-methyl-epsilon-caprolactones and 298 grams of ethylene glycol were heated to 160° C. under nitrogen until the water of condensation ceased to distill off. The reactants were then kept at an increased temperature of 180° C. for an additional twenty-four hours and then subjected to a vacuum of 20 mm. for 3.5 hours at 180–200° C. to remove a small excess of ethylene glycol. The resulting polymer was a water-clear viscous liquid having a hydroxyl number of 49.5 and a carboxyl number of 1.9.

EXAMPLE 32

592 grams of phthalic anhydride, 456 grams of epsilon-caprolactone and 298 grams of ethylene glycol were heated to 160° C. under nitrogen until the water of condensation ceased to distill off. The reactants were then kept at the same temperature for another twenty-four hours and then subjected to a vacuum of 20 mm. for 3.5 hours, still at the same temperature. The resulting polymer was a very viscous, yellow liquid having a hydroxyl number of 48.6 and a carboxyl number of 1.2.

EXAMPLE 33

664 grams of isophthalic acid, 456 grams of epsilon-caprolactone and 318 grams of ethylene glycol were heated to 180° C. under nitrogen for six days. The reactants were then subjected to a vacuum of 20 mm. for four hours while the temperature was increased to 200° C. The resulting polymer was a rubbery, semi-solid material, having a hydroxyl number of 45.9 and a carboxyl number of 0.3.

EXAMPLE 34

A. 304 grams (4 mols) of propylene glycol, 438 grams (3 mols) of adipic acid, 1000 milliliters of benzene and 0.2 gram of tetraisopropyl titanate catalyst are charged to a reaction flask equipped with stirrer, thermometer, and azeotropic head. The reactants are heated to reflux and over a period of 8 hours about 105 grams of water are removed by means of the azeotropic head. The benzene is then removed by distillation and the reaction mixture is subjected to a vacuum of 10 mm. of Hg at 100°–120° C. for a period of two hours to remove a small amount of water of condensation. The resulting viscous liquid product has a hydroxyl value of 177.

B. 630 grams of the above product is copolymerized with 1710 grams of epsilon-caprolactone by heating at 160°–170° C. for a period of 8 hours under an atmosphere of nitrogen. The resulting randomized copolyester is a viscous liquid having a hydroxyl value of 47.8.

C. 1170 grams (0.5 mol) of the above copolyester is reacted with 250 grams of 4,4'-diphenylmethane diisocyanate by heating the reactants at 80°C. for a period of two hours. The resulting isocyanato-terminated polymer has an —NCO content of 2.9 percent as determined by the conventional dibutylamine analysis for the isocyanate group.

With reference to Example 34 above, in lieu of propylene glycol there can be employed various polyhydric alcohols such as the alkanediols; the alkanetriols; the alkanetetrols; the alkanepentols; the alkanehexols; the cycloalkanediols; the cycloalkanetriols; the cycloalkanetetrols; the cycloalkanepentols; the cycloalkanehexols; the poly(alkylene glycols) and the polyoxyalkylene glycols, for example, diethylene glycol, dipropylene glycol, poly(ethylene glycol), poly(propylene glycol), dibutylene glycol, poly(butylene glycol), and polyoxyethyleneoxypropylene glycols, the polyoxyethyleneoxybutylene glycols, the polyoxypropyleneoxybutylene glycols, and the like; the glycosides, for example, the alkyl glycosides, sucrose, the acetals of monohydric alcohols and disaccharides or higher oligosaccharides; the vicinal-epoxyalkane adducts, e.g., ethylene oxide, propylene oxide, butylene oxide, etc., of the above; the polyhydroxyl initiators illustrated previously; the polyols illustrated in U.S. 2,935,488 which are incorporated by reference into this disclosure; the vicinal-epoxyalkane adducts, e.g., ethylene oxide, propylene oxide, butylene oxide, etc., of the polyhydric phenols which phenols are illustrated in U.S. 2,935,488 and which are incorporated by reference into this disclosure; mixtures of the above; and the like.

With further reference to Example 34 above, in lieu of adipic acid there can be employed various polycarboxylic acids and/or their anhydrides such as the aliphatic, aromatic, and cycloaliphatic polycarboxylic acids, preferably dicarboxylic acids, e.g., succinic acid, glutaric acid, adipic acid, pimelic acid, suberic acid, azelaic acid, sebacic acid, alkylsuccinic acids, alkylglutaric acids, 1,2,4-hexanetricarboxylic acid, 1,1,5-pentanetricarboxylic acid, 1,2,4-benzenetricarboxylic acid, 1,2,3,4-benzenetetracarboxylic acid, phthalic acid, terephthalic acid, isophthalic acid, chlorendic acid, chlorendic anhydride, glutaric anhydride, adipic anhydride, succinic anhydride, naphthalic anhydride, phthalic anhydride, hexahydrophthalic anhydride, and the like; the dimer acids, the polycarboxylic acids, and the polycarboxy polyesters such as those illustrated in U.S. 2,935,488 and which are incorporated by reference into this disclosure; the polycarboxylic acid anhydrides such as those illustrated in U.S. 2,918,444 and which are incorporated by reference into this disclosure; the polycarboxyl initiators illustrated previously; mixtures of the above, and the like. Acids such as the oxalic and the malonic acids which may decarboxylate are not desirable.

The ratio of polyhydric alcohol to polycarboxylic acid and/or anhydride will depend upon whether one desires to prepare hydroxyl-terminated polyesters or carboxyl-terminated polyesters. To prepare hydroxyl-terminated polyesters, one employs the polyhydric alcohol and the polycarboxylic acid (and/or their anhydrides) in such relative amounts so as to provide more than one hydroxyl group (equivalent) of the polyhydric alcohol per carboxyl group (equivalent) of the polycarboxylic acid (and/or their anhydrides). It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride. In general, desirable hydroxyl-terminated substantially linear polyesters are obtained by employing a dihydric alcohol and a dicarboxylic acid (and/or their anhydrides) in such relative amounts so as to provide from about 1.2 to about 2 hydroxyl groups of the dihydric alcohol per carboxyl group of the dicarboxylic acid and/or anhydride, and preferably from about 1.4 to about 1.8 hydroxyl groups per carboxyl group. In similar fashion, to prepare carboxyl terminated polyesters one employs the polycarboxylic acid (and/or their anhydride) and the polyhydric alcohol in such relative amounts so as to provide more than 1.0 carboxyl groups of the acid and/or anhydride per hydroxyl group of the polyhydric alcohol. For desirable carboxyl-terminated polyesters one employs the acid and alcohol in such relative amounts so as to provide from about 1.2 to 2 carboxyl groups of the acid and/or anhydride per hydroxyl group of the alcohol.

With further reference to the embodiment illustrated by Example 34 above, the aforesaid hydroxyl-terminated polyesters or carboxyl-terminated polyesters can be reacted with a lactone or mixture of lactones such as those illustrated previously to thus yield valuable hydroxyl-terminated or carboxyl-terminated lactone copolyester products. In general, a molar excess of lactone with relation to the abovesaid polyesters is employed so that the average molecular weights of the resulting lactone copolyester products are in the range of from about 500 to about 20,000. It is preferred, however, that at least two mols of lactone per mol of hydroxyl-terminated or carboxyl-terminated polyesters be employed so that the resulting lactone copolyester polymeric products have an average molecular weight of from about 600 to 5000 and preferably 800 to 3500. The aforesaid novel polymeric products, especially the hydroxy-terminated lactone copolyesters, can be linearly extended by reacting same with a molar excess of an organic diisocyanate to thus produce diisocyanato-terminated polyester polyurethane polymers. The organic diisocyanates which are contemplated include those which have been illustrated previously. It is desirable to employ the aforesaid hydroxyl-terminated lactone copolyesters and organic diisocyanates in such relative amounts so as to provide from about 1.2 to about 2 isocyanato groups of the organic diisocyanates per hydroxyl group of the hydroxyl-terminated lactone copolyester, and preferably from about 1.3 to about 2.

EXAMPLE 35

A. 106 grams of diethylene glycol (1 mol), 684 grams of epsilon-caprolactone (6 mols), 384 grams of mixed methyl-epsilon-caprolactones (3 mols), and 0.05 gram of tetrabutyl titanate are heated at 160°–170° C. under an atmosphere of nitrogen for a period of 8 hours. The resulting lactone copolyester is a liquid product having a molecular weight of about 1170 and a hydroxyl number of about 104.5.

B. 585 grams of the above lactone copolyester diol are reacted with 58 grams of an 80:20 mixture (by weight) of 2,4- and 2,6-toluene diisocyanates at 90° C. under an atmosphere of nitrogen for a period of 2 hours. The resulting hydroxyl-terminated liquid product has a hydroxyl number of 28.9.

EXAMPLE 36

A. 106 grams of diethylene glycol (one mol) and 798 grams of epsilon-caprolactone are polymerized in the presence of 0.05 gram of tetrabutyl titanate by heating to 160–170° C. for eight hours. The resulting polyester upon cooling to room temperature is a solid product having a hydroxyl number of 124 and a molecular weight of about 900.

B. 450 grams of the above caprolactone polyester diol are reacted with 58 grams of an 80:20 mixture (by weight) of 2,4- and 2,6-toluene diisocyanate at 100° C. under nitrogen atmosphere for a period of 2 hours. The resulting hydroxyl-terminated product solidifies upon cooling to room temperature. The product has a hydroxyl number of 36.8.

Examples 35–36 above illustrate further useful embodiments. A particularly valuable embodiment involves the hydroxyl-terminated lactone polyesters which have average molecular weights between about 600 to about 1500, and especially between about 700 to about 1300, and which are prepared via the reaction of a molar excess of epsilon-caprolactone and an organic diol such as those illustrated previously and, in particular, those exemplified by alkylene glycol, polyalkylene glycol, polyoxyalkylene glycol, etc., e.g., ethylene glycol, diethylene glycol, and the like. The aforesaid hydroxyl-terminated lactone polyesters are characterized by an inordinate amount of crystallinity therein which thus places realistic limitations on their applications in certain fields such as the elastomeric fiber field. However, essentially non-crystalline polymeric products can be obtained by reacting the aforesaid lactone polyesters with certain organic diisocyanates under carefully controlled conditions. Of paramount importance is the employment of a sufficient molar excess of said lactone polyester with relation to said organic diisocyanate so that there results hydroxyl-terminated polyurethane lactone polyester products which have average molecular weights of from about 1500 to about 5000, and preferably from about 2000 to about 3800. Secondly, it is essential that the aforesaid reaction be conducted with a substituted an/or unsymmetrical organic diisocyanate such as meta-phenylene diisocyanate, 2,4-tolylene diisocyanate, 2,6-tolylene diisocyanate, and others as exemplified by the publication of Siefken (Annalen, 562, pages 122–135 (1949)), and other well-known publications. At times, it may be desirable to incorporate a minor amount of a symmetrical organic diisocyanate with the substituted and/or unsymmetrical diisocyanates. Thirdly, it is then essential to linearly extend the aforesaid hydroxyl-terminated polyurethane lactone polyester chain by reacting same with a molar excess of a symmetrical organic diisocyanate such as illustrated previously, e.g., p,p'-diphenylmethane diisocyanate, to produce diisocyanate-terminated polyurethane lactone polyester products. The molar ratio of said symmetrical diisocyanate to said hydroxyl terminated polyester is from about 1.2:1 to about 2:1, preferably from about 1.5:1 to about 2:1, and more preferably from about 2:1. The reaction of approximately equimolar amounts of said diisocyanate-terminated products with a bifunctional compound such as the mono- and polyalkylenepolyamines, e.g., ethylenediamine, in accordance, for instance, with well-known textile spinning techniques, results in elastomeric fibers. The ratio of the aforesaid reaction can be from about 0.9 to about 1.1 mols of diisocyanate-terminated products per mol of bifunctional compound.

It is apparent that various modifications will readily occur to those skilled in the art upon reading this description. All such modifications are intended to be included within the scope of the invention as defined in the accompanying claims.

What is claimed is:

1. A process for the preparation of isocyanato terminated lactone polyester polyurethane polymers which comprises reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing a lactone and an organic bifunctional initiator; said lactone being in molar excess with relation to said initiator; said lactone having from six to eight carbon atoms in the lactone ring and at least one hydrogen substituent on the carbon atom which is attached to the oxy group in said ring; said organic bifunctional initiator having two reactive hydrogen substituents selected from the group consisting of hydroxyl, primary amino, secondary amino, and mixtures thereof, each of said reactive hydrogen substituents being capable of opening the lactone ring whereby said lactone is added to said initiator as a substantially linear group thereto; said hydroxyl terminated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group; said hydroxyl terminated lactone polyesters having an average molecular weight of from about 300 to 7,000 and a hydroxyl number of from 374 to 16.

2. A process for the preparation of isocyanato terminated lactone polyester polyurethane polymers which comprises reacting hydroxyl terminated lactone polyesters with an organic diisocyanate, at a molar ratio of said diisocyanate to said lactone polyesters greater than one; said hydroxyl terminated lactone polyesters being formed by heating to a temperature of at least about 50° C. an admixture containing a lactone of the formula:

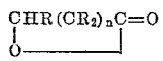

wherein $n$ is an integer of from four to six, wherein at least $n+2R$ variables are hydrogen, and wherein the remaining R variables are of the group consisting of hydrogen, alkyl, cycloalkyl, alkoxy, and single ring aromatic hydrocarbon radicals; and an organic bifunctional initiator; said lactone being in molar excess with relation to said initiator; said organic bifunctional initiator having to reactive hydrogen substituents selected from the group consisting of hydroxyl, primary amino, secondary amino, and mixtures thereof, each of said reactive hydrogen substituents being capable of opening the lactone ring whereby said lactone is added to said initiator as a substantially linear group thereto; said hydroxyl terminated lactone polyesters possessing, on the average, at least two of said linear groups, per reactive hydrogen substituent of said initiator, each of said linear groups having the formula:

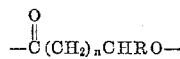

wherein the variables $n$ and R have the aforesaid meanings; said hydroxyl terminated lactone polyesters having an average molecular weight of from about 300 to 7,000 and a hydroxyl number of from 374 to 16.

3. The process of claim 2 wherein said hydroxyl terminated lactone polyesters have an average molecular weight of upwards of about 1500 to about 7,000.

4. A process for the preparation of isocyanato terminated lactone polyester polyurethane polymers which comprises reacting hydroxyl terminated lactone polyesters with an organic diiscoyanate, at a molar ratio of said diisocyanate to said lactone polyesters greater than one; said hydroxyl terminated lactone polyesters being formed by heating to a temperature of at least about 50° C. an admixture containing epsilon-caprolactone and an organic bifunctional initiator; said caprolactone being in molar excess with relation to said initiator, said organic bifunctional initiator having two reactive hydrogen substituents selected from the group consisting of hydroxyl, primary amino, secondary amino, and mixtures thereof, each of said reactive hydrogen substituents being capable of opening the epsilon-caprolactone ring whereby said caprolactone is added to said initiator as a substantially linear group thereto; said hydroxyl terminated lactone polyesters possessing on the average at least two of said linear groups, per reactive hydrogen substituent of said initator, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

5. A process for the preparation of isocyanato terminated lactone polyester polyurethane polymers which comprises reacting hydroxyl terminated lactone polyesters with an organic diisocyanate, at a molar ratio of said diisocyanate to said lactone polyesters greater than one; said hydroxyl terminated lactone polyesters being formed by heating to a temperature of at least about 50° C. an admixture containing epsilon-caprolactone and a diol; said caprolactone being in molar excess with relation to said diol; said diol being capable of opening the caprolactone ring whereby said caprolactone is added to said idol as a substantially linear group thereto; said hydroxyl terminated lactone polyesters possessing, on the average, at least two of said linear group, per hydroxyl group of said diol, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

6. A process for the preparation of isocyanato terminated lactone polyester polyurethane polymers which comprises reacting hydroxyl terminated lactone polyesters with an organic diisocyanate, at a molar ratio of said diisocyanate to said lactone polyesters greater than one;

said hydroxyl terminated lactone polyesters being formed by heating to a temperature of at least about 50° C. an admixture containing epsilon-carpolactone and a polyamine which has at least one reactive hydrogen substituent on each of two reactive amino groups contained therein; said caprolactone being in molar excess with relation to said polyamine; said polyamine being capable of opening the caprolactone ring whereby said caprolactone is added to said polyamine as a substantially linear group thereto; said hydroxyl terminated lactone polyesters possessing, on the average, at least two of said linear groups, per reactive amino group of said polyamine, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

7. A process for the preparation of isocyanato terminated lactone polyester polyurethane polymers which comprises reacting hydroxyl terminated lactone polyesters with an organic diisocyanate, at a molar ratio of said diisocyanate to said lactone polyesters greater than one; said hydroxyl terminated lactone polyesters being formed by heating to a temperature of at least about 50° C. an admixture containing epsilon-caprolactone and an amino alcohol which has two reactive hydrogen substituents; said caprolactone being in molar excess with relation to said amino alcohol, said amino alcohol being capable of opening the caprolactone ring whereby said caprolactone is added to said amino alcohol as a substantially linear group thereto; said hydroxyl terminated lactone polyesters possessing, on the average, at least two of said linear groups, per reactive hydrogen substituent of said amino alcohol, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

8. A process for the preparation of isocyanato terminated lactone copolyester polyurethane polymers which comprises reacting hydroxyl terminated lactone copolyesters with an organic diisocyanate, at molar ratio of said diisocyanate to said lactone copolyesters greater than one; said hydroxyl terminated lactone copolyesters being formed by a method which comprises heating to a temperature of at least about 50° C. (a) an epsilon-caprolactone having at least one hydrogen substituent on the carbon atom which is attached to the oxy group in the caprolactone ring, with (b) a dicarboxylic acid, and (c) a molar excess, in relation to the amount of dicarboxylic acid, of a member of a group consisting of glycols, diamines, and amino alcohols; to produce hydroxyl terminated lactone copolyesters having at least two substantially linear groups therein, each of said linear groups having a terminal oxy group at one end, a carbonyl group at the other end, and an intermediate chain of five carbon atoms which has at least one hydrogen substituent on the carbon atom in said intermediate chain that is attached to said terminal oxy group; said hydroxyl terminated lactone copolyesters having an average molecular weight of from about 500 to about 20,000.

9. Isocyanato terminated lactone polyester polyurethane polymers formed by reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing a lactone and an organic bifunctional initiator; and lactone being in molar excess with relation to said initiator; said lactone having from six to eight carbon atoms in the lactone ring and at least one hydrogen substituent on the carbon atom which is attached to the oxy group in said ring; said organic bifunctional initiator having two reactive hydrogen substituents selected from the group consisting of hydroxyl, primary amino, secondary amino, and mixtures, thereof each of said reactive hydrogen substituents being capable of opening the lactone ring whereby said lactone is added to said initiator as a substantially linear group thereto; said hydroxyl terminated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group; said hydroxyl terminated lactone polyesters having an average molecular weight of from about 300 to 7,000 and a hydroxyl number of from 374 to 16.

10. Isocyanato terminated lactone polyester polyurethane polymers formed by reacting hydroxyl terminated lactone polyesters with an organic diisocyanate, at molar ratio of said diisocyanate to said lactone polyesters greater than one; said hydroxyl terminated lactone polyesters being formed by the reaction of an admixture containing a lactone of the formula:

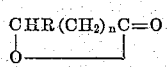

wherein $n$ is an integer of from four to six, wherein at least $n+2R$ variables are hydrogen, and wherein the remaining R variables are of the group consisting of hydrogen, alkyl cycloalkyl, alkoxy, and single ring aromatic hydrocarbon radicals; with an organic bifunctional initiator; said lactone being in molar excess with relation to said initator; said organic bifunctional initiator having two reactive hydrogen substituents selected from the group consisting of hydroxyl, primary amino, secondary amino, and mixtures thereof, each of said reactive hydrogen substituents being capable of opening the lactone ring whereby said lactone is added to said initiator as a substantially linear group thereto; said hydroxyl terminated lactone polyesters possessing, on the average, at least two of said linear groups, per reactive hydrogen substituent of said initiator, each of said linear groups having the formula:

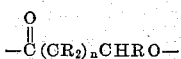

wherein the variables $n$ and R have the aforesaid meanings; said hydroxyl terminated lactone polyesters having an average molecular weight of from about 300 to 7,000 and a hydroxyl number of from 374 to 16.

11. Isocyanato terminated lactone polyester polyurethane polymers formed by reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing epsilon-caprolactone and an organic bifunctional initiator; said caprolactone being in molar excess with relation to said initiator, said organic bifunctional initator having two reactive hydrogen substituents selected from the group consisting of hydroxyl, primary amino, secondary amino, and mixtures thereof, each of said reactive hydrogen substituents being capable of opening the epsilon-caprolactone ring whereby said caprolactone is added to said initiator as a substantially linear group thereto; said hydroxyl terminated lactone polyesters possessing, on the average, at least two of said linear groups, per reactive hydrogen substituent of said initiator, each of said linear groups having a terminal oxy group at one end, a carbonyl group at the other end, and an intermediate chain of five methylene groups; said hydroxyl terminate lactone polyesters having an average molecular weight from about 300 to 7,000 and a hydroxyl number of from 374 to 16.

12. Isocyanato terminated lactone polyester polyurethane polymers formed by reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing epsilon-caprolactone and a diol; said caprolactone being in molar excess with relation to said idol; said diol being capable of opening a caprolactone ring whereby said caprolactone is added to said diol as a substantially linear group thereto; said hydroxyl terminated lactone polyesters possessing, on the average, at least two of said linear groups, per hydroxyl group of said diol, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

13. The polymers of claim 12 where said diol is diethylene glycol.

14. Isocyanato terminated lactone polyester polyurethane polymers formed by reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing epsilon-caprolactone and a polyamine which has at least one reactive hydrogen substituent on each of two reactive amino groups contained therein; said caprolactone being in molar excess with relation to said polyamine; said polyamine being capable of opening the caprolactone ring whereby said caprolactone is added to said polyamine as a substantially linear group thereto; said hydroxyl terminated lactone polyesters possessing, on the average, at least two of said linear groups, per reactive amino group of said polyamine, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

15. Isocyanato terminated lactone polyester polyurethane polymers formed by reacting hydroxyl terminated lactone polyesters with an organic diisocyanate, at a molar ratio of said diisocyanate to said lactone polyesters greater than one; said hydroxyl terminated lactone polyesters being formed by the reaction of an admixture containing epsilon-caprolactone and an amino alcohol which has two reactive hydrogen substituents; said caprolactone being in molar excess with relation to said amino alcohol; said amino alcohol being capable of opening the caprolactone ring whereby said caprolactone is added to said amino alcohol as a substantially linear group thereto; said hydroxyl terminated lactone polyesters possessing, on the average, at least two of said linear groups, per reactive hydrogen substituent of said amino alcohol, each of said linear groups having a terminal oxy group at one end, a carbonyl group at the other end, and an intermediate chain of five methylene groups; said hydroxyl terminated lactone polyesters having an average molecular weight of from about 300 to 7,000 and a hydroxyl number of from 374 to 16.

16. Isocyanato terminated lactone copolyester polyurethane polymers formed by reacting hydroxyl terminated lactone copolyesters with an organic diisocyanate, at a molar ratio of said diisocyanate to said lactone copolyesters greater than one; said hydroxyl terminated lactone copolyesters being formed by a method which comprises reacting (a) an epsilon caprolactone having at least one hydrogen substituent on the carbon atom which is attached to the oxy group in the caprolactone ring, with (b) a dicarboxylic acid, and (c) a molar excess, in relation to the amount of dicarboxylic acid, of a member of the group consisting of glycols, diamines, and amino alcohols; to produce hydroxyl terminated lactone copolyesters having at least two substantially linear groups therein; each of said linear groups having a terminal oxy group at one end, a carbonyl group at the other end, and an intermediate chain of five carbon atoms which has at least one hydrogen substituent on the carbon atom in said intermediate chain that is attached to said terminal oxy group; said hydroxyl terminated lactone copolyesters having an average molecular weight of from about 500 to about 20,000.

17. The polymers of claim 16 wherein said hydroxyl terminated lactone copolyesters have an average molecular weight of from about 600 to 5,000.

No references cited.

LEON J. BERCOVITZ, *Primary Examiner.*